United States Patent
Brandt et al.

(10) Patent No.: US 10,741,866 B2
(45) Date of Patent: Aug. 11, 2020

(54) FUEL CELL ASSEMBLY AND METHOD FOR OPERATING A FUEL CELL ASSEMBLY

(71) Applicant: Siemens Aktiengesellschaft, Munich (DE)

(72) Inventors: Torsten Brandt, Forchheim (DE); Armin Datz, Poxdorf (DE); Albert Hammerschmidt, Erlangen (DE); Silke Latzel, Kleinsendelbach (DE); Josef Lersch, Heroldsbach (DE); Arno Mattejat, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 308 days.

(21) Appl. No.: 15/500,556

(22) PCT Filed: Jul. 28, 2015

(86) PCT No.: PCT/EP2015/067295
§ 371 (c)(1),
(2) Date: Jan. 31, 2017

(87) PCT Pub. No.: WO2016/016254
PCT Pub. Date: Feb. 4, 2016

(65) Prior Publication Data
US 2017/0222249 A1    Aug. 3, 2017

(30) Foreign Application Priority Data
Aug. 1, 2014    (EP) .................................... 14179495

(51) Int. Cl.
*H01M 8/2457*    (2016.01)
*H01M 8/0267*    (2016.01)
(Continued)

(52) U.S. Cl.
CPC ........... *H01M 8/2457* (2016.02); *H01M 4/92* (2013.01); *H01M 4/94* (2013.01); *H01M 8/023* (2013.01);
(Continued)

(58) Field of Classification Search
CPC .. H01M 2008/1095; H01M 4/62; H01M 4/64; H01M 8/0221; H01M 8/023;
(Continued)

(56) References Cited

U.S. PATENT DOCUMENTS

| 8,617,760 B2 | 12/2013 | Fay et al. | |
| 2005/0100780 A1* | 5/2005 | Unoki | H01M 8/023 |
| | | | 429/414 |

(Continued)

FOREIGN PATENT DOCUMENTS

| KR | 20070057151 | 6/2007 |
| WO | WO 2005/035247 A2 | 4/2005 |

*Primary Examiner* — Adam A Arciero
(74) *Attorney, Agent, or Firm* — Cozen O'Connor

(57) ABSTRACT

A fuel cell assembly with at least one PEM fuel cell for generating electrical energy from reactant gases includes at least one membrane/electrode having a membrane coated with platinum electrodes and, respectively positioned on each side, a porous gas diffusion layer, or having a membrane and, respectively positioned on each side, a porous gas diffusion layer coated with a platinum electrode, and also includes bipolar plates that lie against the gas diffusion layers and through which, during operation, a coolant flows, wherein at least one of the platinum electrodes has a smaller area than the gas diffusion layer, where the gas diffusion layer protrudes beyond the platinum electrode for a part of an edge region of the membrane/electrode unit, so that the formation of an electrochemical potential in this part of the edge region of the membrane/electrode unit is prevented in order to prevent damage to the membrane.

12 Claims, 4 Drawing Sheets

(51) Int. Cl.
    *H01M 4/94*     (2006.01)
    *H01M 8/023*     (2016.01)
    *H01M 4/92*     (2006.01)
    *H01M 8/241*     (2016.01)
    *H01M 8/0221*     (2016.01)
    *H01M 8/0284*     (2016.01)
    *H01M 8/1004*     (2016.01)
    *H01M 8/1018*     (2016.01)

(52) U.S. Cl.
    CPC ....... *H01M 8/0221* (2013.01); *H01M 8/0267* (2013.01); *H01M 8/0284* (2013.01); *H01M 8/1004* (2013.01); *H01M 8/241* (2013.01); *H01M 2008/1095* (2013.01)

(58) Field of Classification Search
    CPC ............. H01M 8/0267; H01M 8/0284; H01M 8/1004; H01M 8/241; H01M 8/2457
    See application file for complete search history.

(56) References Cited

U.S. PATENT DOCUMENTS

| | | | |
|---|---|---|---|
| 2006/0127738 A1 | 6/2006 | Sompalli et al. | |
| 2006/0275650 A1* | 12/2006 | Yamada | H01M 8/0245 |
| | | | 429/480 |
| 2007/0134538 A1 | 6/2007 | Yuichi et al. | |
| 2008/0090131 A1 | 4/2008 | de Rouffignac et al. | |
| 2009/0162734 A1* | 6/2009 | Yandrasits | H01M 8/0271 |
| | | | 429/514 |
| 2010/0000679 A1* | 1/2010 | Han | H01M 4/881 |
| | | | 156/330 |

* cited by examiner

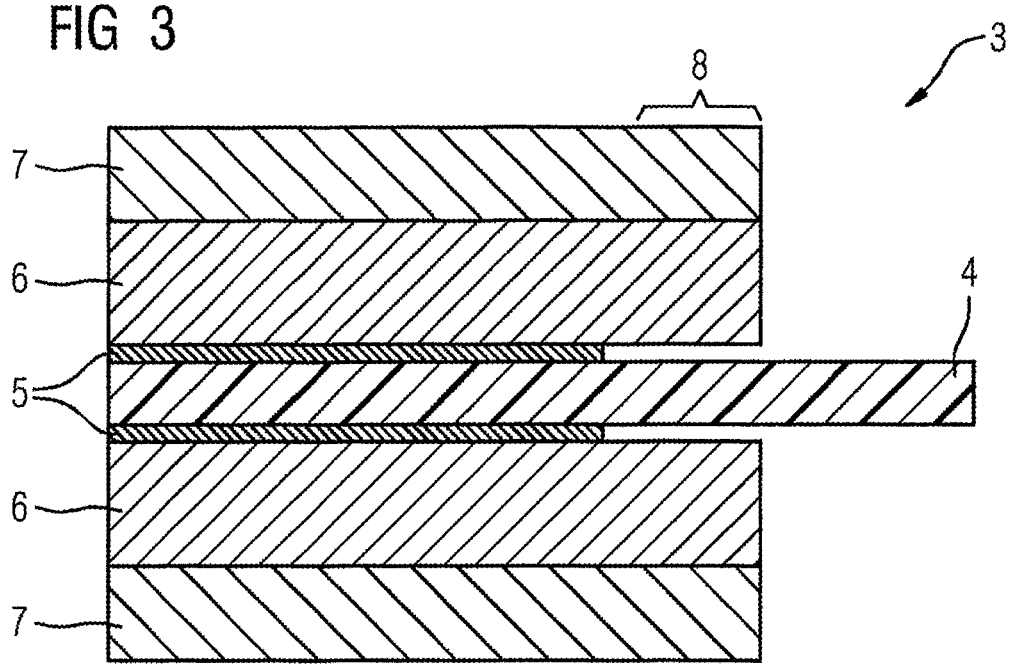
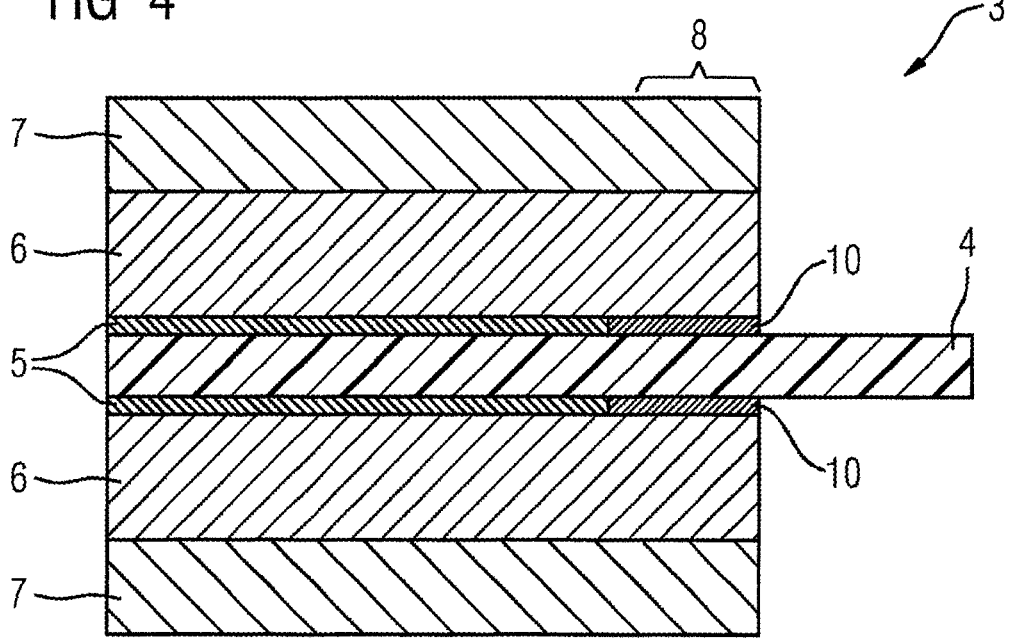

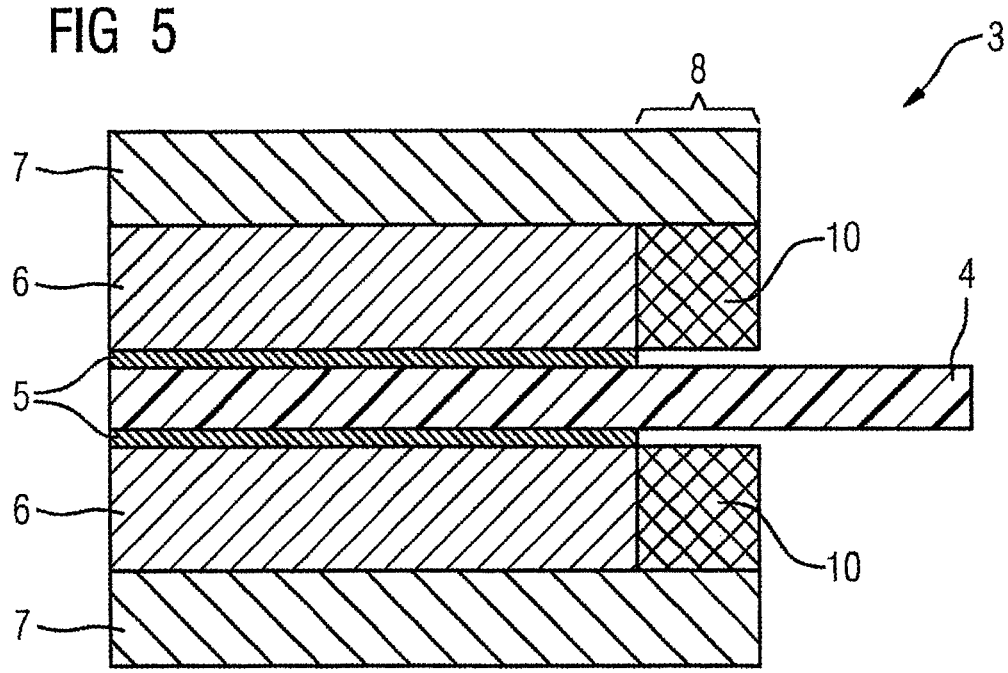

FUEL CELL ASSEMBLY AND METHOD FOR OPERATING A FUEL CELL ASSEMBLY

CROSS-REFERENCE TO RELATED APPLICATIONS

This is a U.S. national stage of application No. PCT/EP2015/067295 filed 28 Jul. 2015. Priority is claimed on European Application No. 14179495 filed 1 Aug. 2014, the content of which is incorporated herein by reference in its entirety.

BACKGROUND OF THE INVENTION

1. Field of the Invention

The invention relates to a fuel cell assembly with at least one proton exchange membrane (PEM) fuel cell for generating electrical energy from the reactant gases hydrogen and oxygen, comprising at least one membrane/electrode unit having a membrane coated with platinum electrodes and having, respectively positioned on each side thereof, a porous gas diffusion layer, or having a membrane and, respectively positioned on each side thereof, a porous gas diffusion layer that is coated with a platinum electrode, and further comprises bipolar plates that lie against the gas diffusion layers and through which, during operation, a coolant flows. The invention further relates to a method for operating the fuel cell assembly.

2. Description of the Related Art

In PEM fuel cells, in an electrochemical process, electric current, heat and water are formed from hydrogen and oxygen. The fundamental construction is configured such that gas chambers and cooling chambers in "bipolar plates" adjoin a membrane/electrode unit (or membrane electrode assembly (MEA)). The membrane/electrode unit contains, in particular, a proton-conducting membrane that is coated on both sides with platinum electrodes (e.g., catalyst layer). These, in turn, are covered by a gas-permeable, electrode-conducting gas diffusion layer. Alternatively, the gas diffusion layer can also be coated with the platinum electrode (catalyst layer) on a side facing toward the membrane. The gas diffusion layer also has the task of removing the product water on the cathode side from the production zone on the border layer with the platinum electrode and the membrane. For this purpose, the gas diffusion layer, which is typically made of carbon fiber material (e.g., carbon paper, carbon fiber fabric or nonwoven fabric), is made hydrophobic on the surface, i.e., on the carbon fibers or in the hollow spaces.

Heat produced during fuel cell operation is usually removed from the bipolar plate by a coolant flow, i.e., a cooling water flow. As a result, a thermal gradient forms in the bipolar plate from the coolant entry to the coolant exit, i.e., a higher temperature prevails in the region of the coolant exit than at the coolant entry. The reactant (e.g., oxygen and hydrogen) exit is also often situated in the region of the coolant exit. On the oxygen side, a large quantity of product water arises which must be completely removed from the gas diffusion layer. On the hydrogen side, in this region, the hydrogen can be effectively converted due to the very good flow. With this, in the region of the conversion of the hydrogen that is already heated by the coolant flow, additional waste heat arises, which can lead to a further temperature rise.

In an ideal case, there is an evenly rising temperature gradient between the coolant entry and exit with little or no temperature rises at the corners or edges of the bipolar plate. In reality, however, at sites critical to flow dynamics (e.g., dead zones or corners) significant temperature increases (for example, 10 to 20 Kelvin as compared with the coolant exit) can arise. This effect can be further strengthened in these critical regions if the coolant water flow of the bipolar plate is significantly reduced, for example, due to faults (e.g., blocking of cooling channels or unintended reduction of the coolant water pump output). In an extreme case, this can lead via different mechanisms (for example, low humidity—formation of hydrogen peroxide and consequent chemical attack on the membrane, mechanical loading by means of humid/dry cycles) to mechanical weakening of the membrane or thickness reduction and even hole formation, which leads to the failure of the cell and, thus, failure of the overall fuel cell stack.

Conventionally, the problem is typically handled by attempting, with a suitable optimization of the flow geometry of the bipolar plate, to prevent such hot points.

U.S. Pat. No. 8,617,760 B2 discloses another solution to the foregoing problems. According to this document, the proton-conducting membrane is deactivated in the critical regions via the incorporation of metal ions.

Firstly, US 2010/000679 A1 discloses a proton exchange membrane (PEM) fuel cell, where the catalyst layer has the same area as the gas diffusion layer and, thus, the gas diffusion layer does not protrude beyond the catalyst layer over the entire region around the outer periphery of the catalyst layer. Secondly, in another conventional PEM fuel cell, the catalyst layer has a smaller area than the gas diffusion layer and thus, over the entire region round the outer periphery of the catalyst layer, the gas diffusion layer protrudes beyond the catalyst layer.

US 2009/0162734 A1 discloses a fuel cell assembly with a PEM fuel cell, where the platinum electrode has a smaller area than the gas diffusion layer, and where over the entire edge region of the membrane/electrode unit, i.e., the entire region around the outer periphery of the membrane/electrode unit, the gas diffusion layer protrudes beyond the platinum electrode. With this protrusion, in conjunction with a seal extending round the entire edge region of the membrane/electrode unit and a resin layer extending around the entire edge region of the membrane/electrode unit, the contact between the gas diffusion layer and the membrane/electrode unit and their sealing can be improved.

US 2006/127738 A1 discloses a fuel cell construction in which over the entire edge region of the membrane/electrode unit, an adhesive is arranged between the membrane and the gas diffusion layers. As the adhesive, for example, acrylic or thermoplastic elastomers can be used. The presence of the adhesive reduces the stretch loading at the edges of the membrane that are not supported by electrodes. The adhesive acts as a sealant and thus prevents chemical degradation of the membrane. The gas diffusion layers are porous. As a result, the adhesive can penetrate into the pores of the gas diffusion layers.

SUMMARY OF THE INVENTION

It is an object of the invention, with a pre-defined geometry of the bipolar plate and without major detriment in the generation of the electrical energy, to provide measures in the region of the membrane/electrode unit that prevent the aforementioned faults.

This and other objects and advantages are achieved in accordance with the invention via a fuel cell assembly with at least one PEM fuel cell for generating electrical energy from the reactant gases hydrogen and oxygen, comprising at least one membrane/electrode unit having a membrane coated with platinum electrodes and having, respectively positioned on each side thereof, a porous gas diffusion layer, and further comprising bipolar plates that lie against the gas diffusion layers and through which, during operation, a coolant flows, where at least one of the platinum electrodes has a smaller area than the gas diffusion layer, where for a part of an edge region of the membrane/electrode unit, the gas diffusion layer protrudes beyond the platinum electrode and for another part of the edge region of the membrane/electrode unit, the gas diffusion layer does not protrude beyond the platinum electrode.

It is also an object of the invention to provide a method for operating a fuel cell assembly in accordance with the invention, where for a part of an edge region of the membrane/electrode unit, the platinum electrode is recessed and the gas diffusion layer protrudes beyond the platinum electrode such that the formation of an electrical potential in this part of the edge region of the membrane/electrode unit is prevented and for another part of the edge region of the membrane/electrode unit, the platinum electrode is not recessed and the gas diffusion layer does not protrude beyond the platinum electrode such that the formation of an electrical potential in this part of the edge region of the membrane/electrode unit is not prevented.

As is clear to a person skilled in the art, the advantages disclosed below with regard to the fuel cell and the method and preferred embodiments can also be passed on to a fuel cell, where the gas diffusion layer is coated with the platinum electrode (e.g., catalyst layer).

The invention is based on the idea of omitting the platinum electrode at the thermally critical site so that the gas diffusion layer protrudes beyond the platinum electrode and, thus, at this site, no electrochemical potential or electrochemical reaction relating to the occurrence of hydrogen peroxide arises. In this way, an electrochemical reaction at the platinum electrode that leads through the production of either heat or potential to weaken or damage the membrane in the observed "endangered" region can be prevented. Through the modification of the platinum electrode in the "endangered" regions (i.e., regions that can possibly become too hot or can otherwise be damaged), even with the defined bipolar plate configuration, failure-free operation can be realized. In the other edge regions without any protrusion, however, an electrochemical reaction can still occur at the platinum electrode, so that the aforementioned measures are possible without major sacrifices in the generation of the electrical energy in the fuel cell.

Preferably, the protrusion of the gas diffusion layer beyond the platinum electrode in the region of a coolant exit from the bipolar plate is provided because, due to the temperature gradient between the coolant entry and the coolant exit of the bipolar plate, there exists an increased danger of overheating in the region of the coolant exit.

With regard to an efficient effect of the mechanical block, in accordance with a preferred embodiment, in the region of the protrusion, access by a reactant gas to the membrane is blocked by a mechanical block between the gas diffusion layer and the membrane. Thus the reactant gas can become distributed in the gas diffusion layer, but does not reach the platinum electrode of the membrane/electrode unit at the critical sites.

In this case, the mechanical block is advantageously a gas-impermeable film with a low thickness so that the film can be introduced without fault between the gas diffusion layer and the membrane/electrode unit. The film is made, for example, of Teflon. A good oxygen resistance is herein essential to the material selection on the cathode side.

In accordance with a further preferred embodiment, the mechanical block is contained within pores of the gas diffusion layer. This presently contemplated embodiment is distinguished by configuration changes merely to the gas diffusion layer and all other components of the fuel cell remain unaltered. Herein, the mechanical block is preferably an acrylic adhesive or a fluorothermoplastic. The mechanical block is herein formed from a polymer filler, such as fluorothermoplastic, which is introduced via a suitable thermal treatment. On the cathode side, corresponding oxygen-resistance is necessary.

BRIEF DESCRIPTION OF THE DRAWINGS

An exemplary embodiment of the invention will now be described in greater detail making reference to the figures, in which:

FIG. 3 is a cross-section of a first embodiment of a fuel cell in accordance with the invention;

FIG. 4 is a cross-section of a second embodiment of a fuel cell in accordance with the invention;

FIG. 5 is a cross-section of a third embodiment of a fuel cell in accordance with the invention.

DETAILED DESCRIPTION OF THE EXEMPLARY EMBODIMENTS

The same reference signs have the same meaning in the different figures.

Figure 1:
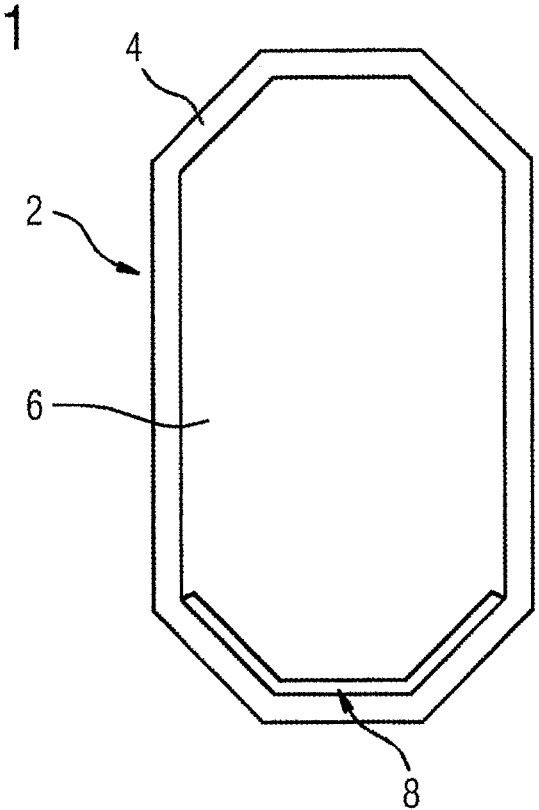
FIG. 1 is a first plan view of a membrane/electrode unit and a gas diffusion layer lying thereon where a first, exemplary, critical region is identified.
Figure 2:
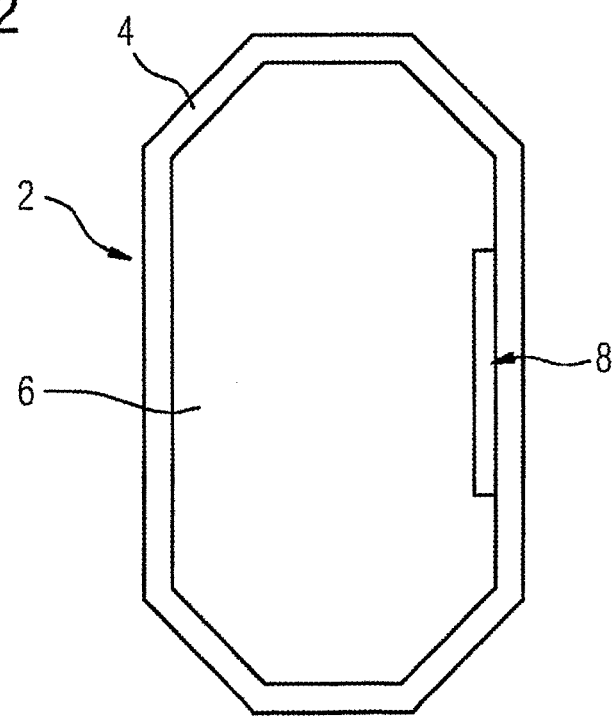
FIG. 2 is a second plan view of a membrane/electrode unit and a gas diffusion layer lying thereon where a second, exemplary, critical region is identified.

Shown in FIGS. 1 and 2, respectively, is a membrane/electrode unit 2 that is part of a fuel cell assembly 3 (not shown here in detail) that consists in the illustrated exemplary embodiment of a single proton exchange membrane (PEM) fuel cell. The PEM fuel cell 3 is shown in cross-section in FIGS. 3 to 5.

The membrane/electrode unit 2 comprises a proton-conducting membrane 4 that is coated on both sides with a catalyst layer of platinum (not shown here) that forms a platinum electrode 5 (see, e.g., FIGS. 3 to 5). Placed on each side of the membrane 4 is a gas diffusion layer 6, which contacts the platinum electrode 5. Alternatively, the catalyst layer of platinum that forms a platinum electrode 5 can also be applied to the gas diffusion layer 6 on the side facing toward the membrane 4.

As shown in FIGS. 3 to 5, the fuel cell 3 also comprises, adjoining the gas diffusion layer 6, a bipolar plate 7 (in reality, a space is at least partially present between the bipolar plate 7 and the gas diffusion layer 6) through which, during operation a coolant, i.e., cooling water, flows. With this, heat generated in the membrane/electrode unit 2 is transported away.

In FIGS. 1 and 2, reference sign 8 denotes two differently arranged exemplary critical sites at which there is an increased probability that a disruption of the function of the membrane 6 or a local destruction of the membrane 6 can occur. For example, such a critical site 8 is at the coolant exit from the bipolar plate 7, as shown in FIG. 1. The critical sites 8 are always located in the edge region of the membrane/electrode unit 2 or the gas diffusion layer 6.

The edge region is herein understood to be the region around the outer periphery of the membrane/electrode unit 2.

In FIG. 3, a first arrangement of the fuel cell 3 is shown in which, at a critical site 8 in the edge region, the platinum electrodes 5 are recessed, so that for this part of the edge region, the gas diffusion layer 6 protrudes beyond the platinum electrode 5. With this, the platinum electrodes 5 have a smaller area than the gas diffusion layer 6. In this way, formation of an electrochemical potential forms at the critical site 8 is prevented.

In FIG. 4 also, the platinum electrode 5 is also recessed, with the difference from FIG. 3 being that a film-like mechanical block 10 in the manner of a film is provided between the membrane 4 and the gas diffusion layer 6. At the critical site 8, the platinum electrode 5 is thus replaced by the film 10.

In FIG. 5, a third alternative embodiment of the fuel cell 3 is shown, where the porous gas diffusion layer 6 is filled with the mechanical block 10, specifically only in the region of the critical site 8, where the platinum electrode 5 is omitted. The mechanical block 10 is herein a mass, such as a thermoplastic, fluorinated polymer filler or an acrylic adhesive.

Figure 6:
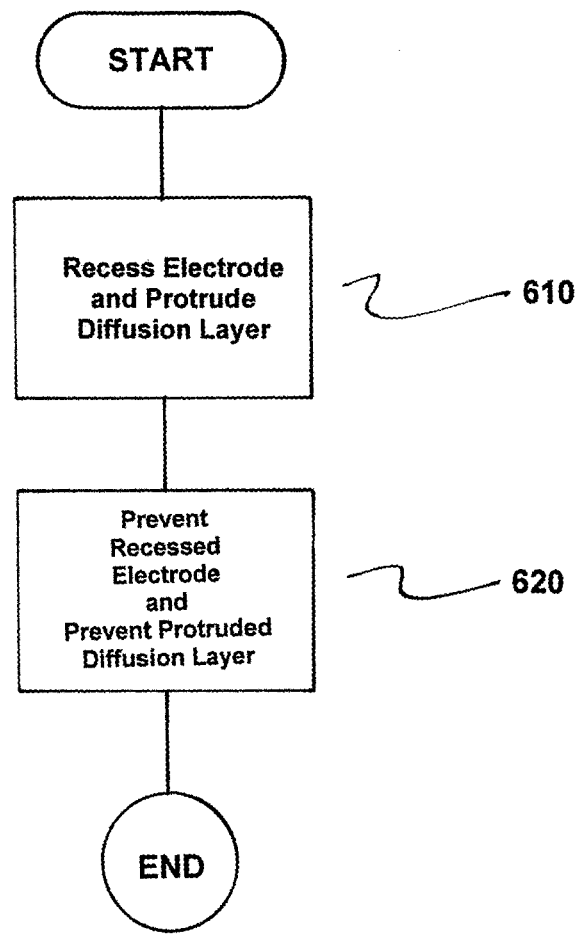
FIG. 6 is a flowchart of the method in accordance with the invention.

FIG. 6 is a flowchart of a method for operating a fuel cell assembly 3 with at least one proton exchange membrane (PEM) fuel cell for generating electrical energy from the reactant gases hydrogen and oxygen. The method comprises recessing a platinum electrode 5 and protruding a gas diffusion layer 6 beyond the platinum electrode 5 such that formation of an electrical potential in this part of an edge region of the membrane/electrode unit 2 is prevented for a part of the edge region of the membrane/electrode unit 2, as indicated in step 610. Next, the platinum electrode 5 is not recessed and ensuring the gas diffusion layer 6 is arranged to not protrude beyond the platinum electrode 5 such that formation of an electrochemical potential in this part of the edge region of the membrane/electrode unit 2 is not prevented for another part of the edge region of the membrane/electrode unit 2, as indicated in step 620.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a fuel cell assembly with at least one proton exchange membrane fuel cell for generating electrical energy from the reactant gases hydrogen and oxygen, the method comprising:
   recessing a platinum electrode and protruding a gas diffusion layer beyond the platinum electrode at a region of a coolant exit from a bipolar plate such that formation of an electrical potential in this part of an edge region of a membrane/electrode unit is prevented for a part of the edge region of the membrane/electrode unit; and
   ensuring the platinum electrode is not recessed and ensuring the gas diffusion layer does not protrude beyond the platinum electrode such that formation of an electrochemical potential in this part of the edge region of the membrane/electrode unit is not prevented for another part of another edge region of the membrane/electrode unit.

2. A fuel cell assembly with at least one proton exchange membrane fuel cell for generating electrical energy from reactant gases comprising hydrogen and oxygen, comprising:
   at least one membrane/electrode unit having a membrane coated with platinum electrodes and having, respectively positioned on each side thereof, a porous gas diffusion layer;
   bipolar plates which lie against each porous diffusion layer and through which, during operation, a coolant flows;
   wherein at least one platinum electrode of the platinum electrodes has a smaller area than the gas diffusion layer;
   wherein the gas diffusion layer protrudes beyond the at least one platinum electrode for a part of an edge region of the membrane/electrode unit and the gas diffusion layer does not protrude beyond the at least one platinum electrode for another part of the edge region of the membrane/electrode unit;
   wherein the edge region is a region around an outer periphery of the membrane/electrode unit; and
   wherein the protrusion of the gas diffusion layer beyond the platinum electrode is provided at a region of a coolant exit from the bipolar plates.

3. The fuel cell as claimed in claim 2, wherein access by at least one of the reactant gases comprising hydrogen and oxygen to the membrane is blocked by a mechanical block disposed between the gas diffusion layer and the membrane in a region of the protrusion.

4. The fuel cell as claimed in claim 3, wherein the mechanical block comprises a gas-impermeable film.

5. The fuel cell as claimed in claim 3, wherein the mechanical block is contained within pores of the gas diffusion layer.

6. The fuel cell as claimed in claim 5, wherein the mechanical block comprises one of (i) an acrylic adhesive and (ii) a fluorothermoplastic.

7. A fuel cell assembly with at least one proton exchange membrane fuel cell for generating electrical energy from the reactant gases hydrogen and oxygen, comprising:
   at least one membrane/electrode unit having a membrane and, respectively positioned on each side thereof, a porous gas diffusion layer coated with a platinum electrode;
   bipolar plates which lie against each gas diffusion layer and through which, during operation, a coolant flows;
   wherein the platinum electrode has a smaller area than the gas diffusion layer;
   wherein the gas diffusion layer protrudes beyond the platinum electrode for a part of an edge region of the membrane/electrode unit and the gas diffusion layer does not protrude beyond the platinum electrode for another part of the edge region of the membrane/electrode unit;

wherein the edge region is a region around an outer periphery of the membrane/electrode unit; and wherein the protrusion of the gas diffusion layer beyond the platinum electrode is provided at a region of a coolant exit from the bipolar plate.

8. The fuel cell as claimed in claim 7, wherein access by at least one of the reactant gases comprising hydrogen and oxygen to the membrane is blocked by a mechanical block disposed between the gas diffusion layer and the membrane in a region of the protrusion.

9. The fuel cell as claimed in claim 7, wherein access by at least one of the reactant gases comprising hydrogen and oxygen to the membrane is blocked by a mechanical block disposed between the gas diffusion layer and the membrane in a region of the protrusion.

10. The fuel cell as claimed in claim 8, wherein the mechanical block comprises a gas-impermeable film.

11. The fuel cell as claimed in claim 8, wherein the mechanical block is contained within pores of the gas diffusion layer.

12. The fuel cell as claimed in claim 11, wherein the mechanical block comprises one of (i) an acrylic adhesive and (ii) a fluorothermoplastic.

* * * * *